(12) United States Patent
Hardy

(10) Patent No.: US 10,063,605 B2
(45) Date of Patent: *Aug. 28, 2018

(54) APPARATUS, SYSTEMS AND METHODS FOR PROVIDING EDGE CACHED MEDIA CONTENT TO MEDIA DEVICES BASED ON USER HISTORY

(71) Applicant: EchoStar Technologies L.L.C., Englewood, CO (US)

(72) Inventor: Christofer Hardy, Cheyenne, WY (US)

(73) Assignee: EchoStar Technologies L.L.C., Englewood, CO (US)

( * ) Notice: Subject to any disclaimer, the term of this patent is extended or adjusted under 35 U.S.C. 154(b) by 220 days.

This patent is subject to a terminal disclaimer.

(21) Appl. No.: 14/589,585

(22) Filed: Jan. 5, 2015

(65) Prior Publication Data

US 2015/0127780 A1    May 7, 2015

Related U.S. Application Data

(63) Continuation of application No. 13/352,822, filed on Jan. 18, 2012, now Pat. No. 8,930,491.

(51) Int. Cl.
*G06F 15/16* (2006.01)
*H04L 29/06* (2006.01)
*H04N 21/25* (2011.01)
*H04N 21/254* (2011.01)
*H04N 21/258* (2011.01)
(Continued)

(52) U.S. Cl.
CPC .......... *H04L 65/60* (2013.01); *H04L 65/4076* (2013.01); *H04L 65/4084* (2013.01); *H04L 67/10* (2013.01); *H04N 21/251* (2013.01); *H04N 21/254* (2013.01); *H04N 21/25891* (2013.01); *H04N 21/262* (2013.01); *H04N 21/4331* (2013.01); *H04N 21/4622* (2013.01)

(58) Field of Classification Search
None
See application file for complete search history.

(56) References Cited

U.S. PATENT DOCUMENTS 7,454,485 B2    11/2008  Kukkal
7,664,854 B2     2/2010  Fukasawa et al.
(Continued)

*Primary Examiner* — Younes Naji
(74) *Attorney, Agent, or Firm* — Lowe Graham Jones PLLC

(57) ABSTRACT

Systems and methods provide media content events to media devices. An exemplary system receives a request for a media content event from a first media device; communicates the media content event to an edge server that is communicatively coupled to the first media device based on an identifier of the requesting media device; identifies a second media device based on preferred media content event characteristics associated with the second media device, wherein at least one media content event characteristic of the requested media content event corresponds to at least one of the preferred media content event characteristics of the second media device, and wherein the second media device is able to communicatively couple to the edge server; and in response to identifying the second media device, communicates an identifier of the second media device to the edge server, wherein the requested media content event is communicated to the second media device.

20 Claims, 2 Drawing Sheets

(51) Int. Cl.
*H04N 21/262* (2011.01)
*H04N 21/433* (2011.01)
*H04N 21/462* (2011.01)
*H04L 29/08* (2006.01)

(56) References Cited

U.S. PATENT DOCUMENTS

| | | |
|---|---|---|
| 7,761,542 B2 | 7/2010 | Nakamura et al. |
| 8,081,957 B2 | 12/2011 | O'Neill |
| 8,108,939 B2 * | 1/2012 | Bhatia ............... G06F 17/30902 726/28 |
| 8,363,666 B2 | 1/2013 | Donthamsetty et al. |
| 8,634,703 B1 * | 1/2014 | Barton ............. H04N 21/47202 386/261 |
| 2002/0026580 A1 * | 2/2002 | Igari ....................... G06F 21/80 713/168 |
| 2005/0005303 A1 | 1/2005 | Barone, Jr. et al. |
| 2007/0198689 A1 | 8/2007 | Sutardja |
| 2008/0039058 A1 * | 2/2008 | Ray ....................... H04W 28/14 455/414.3 |
| 2008/0276266 A1 | 11/2008 | Huchital et al. |
| 2009/0228491 A1 * | 9/2009 | Malik ............... G06F 17/30067 |
| 2009/0298525 A1 | 12/2009 | Shaffer et al. |
| 2010/0017822 A1 * | 1/2010 | Kim ..................... G11B 27/034 725/40 |
| 2010/0250772 A1 * | 9/2010 | Mao .................... H04N 21/222 709/231 |
| 2010/0325675 A1 * | 12/2010 | Smoyer .............. H04N 7/17318 725/97 |
| 2011/0047251 A1 * | 2/2011 | Seo ....................... G06Q 30/00 709/219 |
| 2011/0127202 A1 | 6/2011 | Garringer et al. |
| 2012/0018528 A1 | 1/2012 | Samain |
| 2012/0110074 A1 * | 5/2012 | Getchius ............. H04L 61/1523 709/204 |

* cited by examiner

APPARATUS, SYSTEMS AND METHODS FOR PROVIDING EDGE CACHED MEDIA CONTENT TO MEDIA DEVICES BASED ON USER HISTORY

PRIORITY CLAIM

This patent application is a Continuation of U.S. Non-Provisional patent application Ser. No. 13/352,822, filed Jan. 18, 2012, published as U.S. Publication No. 2013/0185382, entitled "APPARATUS, SYSTEMS AND METHODS FOR PROVIDING EDGE CACHED MEDIA CONTENT TO MEDIA DEVICES BASED ON USER HISTORY" and issued as U.S. Pat. No. 8,930,491 on Jan. 6, 2015, the content of which is incorporated herewith in its entirety.

BACKGROUND

Media devices, such as a set top box, a stereo, a television, a computer system, a game system, or the like, are often configured to receive media content for presentation to a user viewing and listening to one or more media presentation devices. For example, a set top box (STB) may receive a media content event, such as a movie. After processing, the STB communicates the movie to a television and/or receiver system for presentation to the user.

Various media content provider systems employ a broadcast-based medium which broadcasts, from a single source, media content to many media devices. For example, a satellite-based media content provider system uplinks media content to a plurality of satellites. The satellites then broadcast the media content down many earth-based antennas which receive the satellite signals. The received satellite signals are processed and communicated to a STB that is communicatively coupled to the antenna. The STB further processes the received satellite signal to generate a signal corresponding to the media content event that is sent to the media presentation devices.

However, the user of a media device receiving the broadcasted media content is limited to selecting only the currently available broadcast media content. Even though hundreds of channels of different media content may be available, the user may wish to view a media content event that is not being currently broadcast. For example, the user may wish to view a particular movie that is not currently being broadcasted.

Some STBs are provisioned with a digital video recorder (DVR) that is configured to store a plurality of media content events using a large memory capacity storage medium. In some instances, where the user is aware of a scheduled future broadcast time of the particular media content event of interest, the user may configure their STB to automatically save the particular media content event of interest when it is broadcasted over the media content provider system and is received at the STB.

In other instances, the media content provider may select one or more media content events of interest which the media content provider believes will likely be of interest to the user. The selected media content events of interest are broadcast to the STB and are automatically saved into the DVR. In some instances, the broadcasting occurs over a secure channel that is not user accessible, and/or is broadcast during off peak usage times, such as late at night. If the user wishes to view one or more of these pre-stored media content events, then the pre-stored media content events are immediately accessible from the STB DVR. Typically, such pre-stored media content events are premium programs or movies available on a pay-per-view basis. Thus, the user must make arrangements with the media content provider to obtain authorization to access the pre-stored media content events of interest.

In yet another instance, the STB may have a backchannel connection that provides a communication link back to a remote media content access device. Once the user has made arrangements with the media content provider for authorized access to a particular media content event of interest, the selected media content event of interest is communicated from the remote media content access device to the STB via the established communication link. An example backchannel is an Internet connection which is configured to connect the STB to the Internet. The media content access device may be an internet site or the like. Accordingly, the selected media content event of interest is sent from the media content access device to the STB via the Internet.

However, media content events of interest may be very data intensive, particularly if the selected media content event of interest is provided in a high definition (HD) format. Due to the amount of data of the selected media content event of interest, due to other traffic over the Internet, and due to other transfer capacity limitations, the selected media content event of interest may not be able to be communicated from the remote media content access device to a particular STB in real time. That is, the user may have to wait some duration for communication of the selected media content event of interest, or for communication of at least a substantial initial portion of the selected media content event of interest, before the user may begin to view the selected media content event of interest. In view of this delay, the user may opt to forgo selecting the particular media content event of interest, and instead, choose to view an immediately available (and likely cost free) different media content event of interest.

Accordingly, there is a need in the arts to provide systems and methods that are more effective in providing media content events of interest to a user in a timely manner.

SUMMARY

Systems and methods operable to provide media content events to media devices are disclosed. An exemplary embodiment receives, at a media content event access system, a request from a first media device for a media content event; communicates the requested media content event from the media content event access system to an edge server that is communicatively coupled to the first media device, wherein the first media device is identified by a first identifier, and wherein the edge server communicates the requested media content event to the first media device based on the first identifier; identifies a second media device based on preferred media content event characteristics associated with the second media device, wherein at least one media content event characteristic of the requested media content event corresponds to at least one of the preferred media content event characteristics associated with the second media device, and wherein the second media device is able to communicatively couple to the edge server; in response to identifying the second media device, communicates an identifier of the second media device to the edge server; wherein the requested media content event is also communicated to the identified second media device.

BRIEF DESCRIPTION OF THE DRAWINGS

Preferred and alternative embodiments are described in detail below with reference to the following drawings.

DETAILED DESCRIPTION

Figure 1:
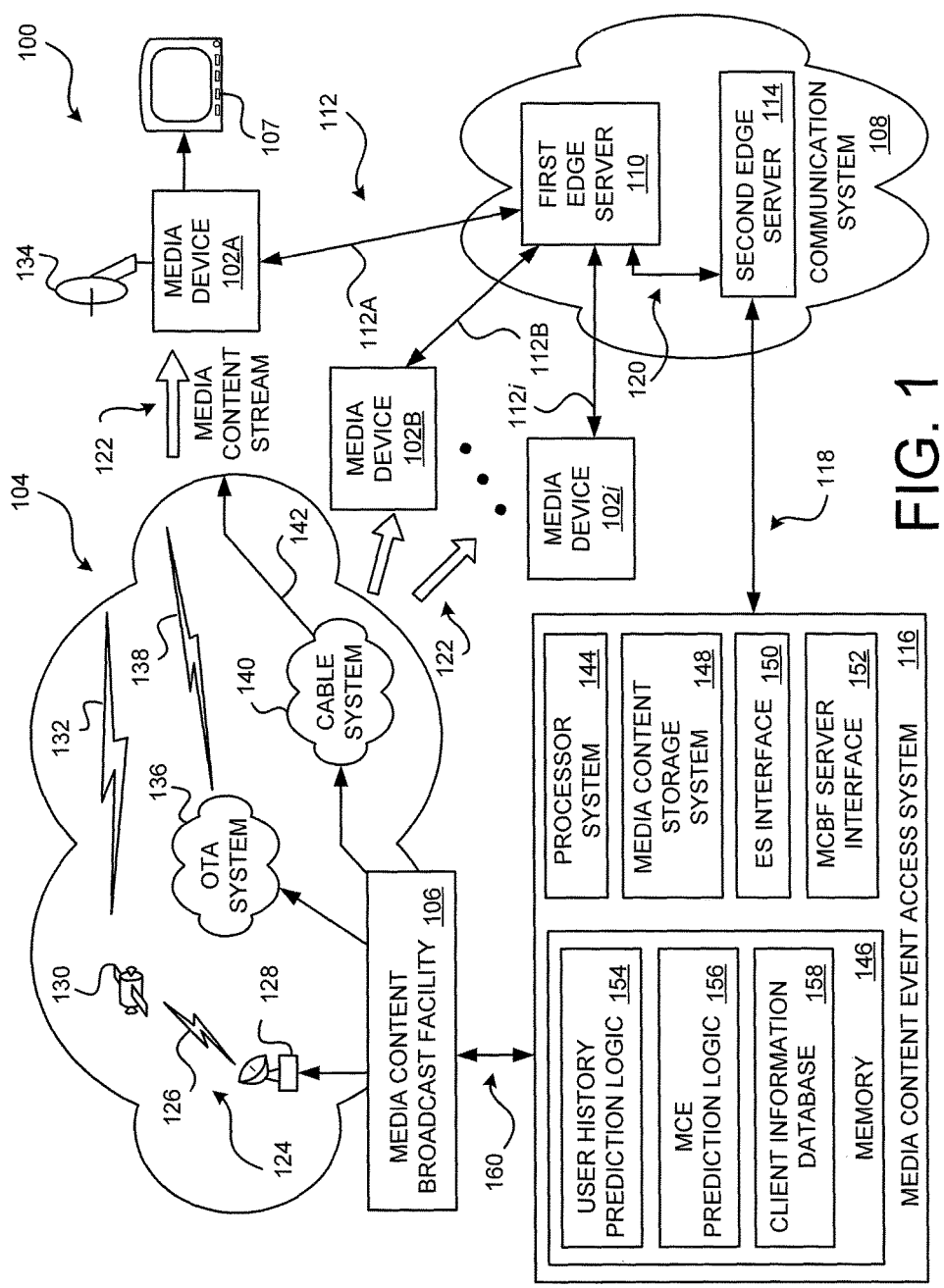
FIG. 1 is a block diagram of an embodiment of an automatic content download manager system implemented in communication environment having a plurality of exemplary media devices.

FIG. 1 is a block diagram of an embodiment of an automatic content download manager system 100 implemented in a communication environment having a plurality of exemplary media devices 102a-i, generically referred to as a media device 102. Examples of media devices 102a-i may include, but are not limited to, a set top box (STB), storage medium (referred to interchangeably as a digital video recorder (DVR)), a game playing device, a personal computer (PC), a netbook, or the like that are configured to receive media content that is broadcasted from the media content broadcast facility 106. The media content may be then presented on a media presentation device 107, such as the non-limiting example television (TV). The storage medium may be any storage medium configured to store media content events.

The media devices 102 receive broadcasted media content in a broadcasted media content signal communicated via a media content broadcast communication environment 104. The media content is broadcast from a media content broadcast facility 106. In some systems, the media content broadcast facility 106 may be referred to as a head end. The media content broadcast facility 106 is operated by a media content provider. The media content provider controls which particular media content events, and the broadcast times of the media content events, that are broadcasted from the media content broadcast facility 106.

The automatic content download manager system 100 embodied in the example media devices 102a-i is further configured to bidirectionally communicate via a communication system 108. A portion of the communication system 108 is preferably a node-based communication system, and may be a private data transport system that transports data (such as media content events) for a fee. Other portions of the communication system 108 may be a public system, such as the Internet or the like. In some embodiments, the communication system 108 is a plurality of discrete communication networks interconnected by nodes, such as edge servers. (One skilled in the art appreciates that individual portions of the communication system 108 are not illustrated.)

In the example embodiment of FIG. 1, a first edge server 110 is communicatively coupled to each of the media devices 102a-i via a suitable communication link 112a-i, generically referred to as a communication link 112. A second edge server 114 is communicatively coupled to the media content event access system 116 via a suitable communication link 118. The communication links 112 and/or 118 may be established on an as-needed basis, may be a dedicated communication link, or may be a network of a plurality of cooperatively operating individual communication links.

The second edge server 114 is configurable to communicate to the first edge server 110 via a suitable communication link 120 established over the communication system 108. The communication link 120 may be established across a plurality of intervening nodes. Alternatively, or additionally, the communication link 120 may be established external to the communication system 108. Further, the communication link 120 may be a dedicated communication link, or may be a plurality of individual communication links, associated with an edge server communication system. In contrast, the communication links 112 may be established between the first edge server 110 and the media devices 102 via the Internet.

Embodiments of the automatic content download manager system 100 are configured to provide a particular media content event to a requesting one of the media devices 102. The requested media content event is stored (cached) at the media content event access system 116, and is typically not being currently broadcasted from the media content broadcast facility 106. Further, the requested media content event has not been stored on the requesting one of the media devices 102 (since if stored, the media content event could be directly accessed from the user's media device 102).

The request for the requested media content event may be communicated from the requesting media device 102 to the media content event access system 116 in any suitable manner. In an example embodiment, the requesting media device 102 may communicate the request to the media content event access system 116 over an established Internet-based communication link (not shown). Alternatively, or additionally, the requesting media device 102 may communicate the request to the media content event access system 116 over the links 112, 120, 118. Alternatively, or additionally, the requesting media device 102 may communicate the request to the media content broadcast facility 106, or to another remote device and/or third party entity, which then communicates the request to the media content event access system 116.

In response to receiving the request for a particular media content event, the requested media content event is communicated from the media content event access system 116 to the second edge server 114, via the communication link 118. Then, the requested media content event is communicated from the second edge server 114 to the first edge server 110, via the communication link 120. In some embodiments, the requested media content event is communicated from media content event access system 116 to the first edge server 110.

The requested media content event is temporarily stored (cached) at the first edge server 110. The identifier associated with the requesting media device 102 is included with, or associated with, the received requested media content event. The identifier uniquely identifies each particular media device 120 from a plurality of other media devices 120, Accordingly, the first edge server 110 may use the identifier of the requesting media device 102 to communicate the requested media content event to the requesting media device 102. (The requesting media device 102 is one of the media devices 102a-i that are linked to the first edge server 110 via their respective communication link 112a-i).

The requested media content event is temporarily stored in the first edge server 110 for a specified or predefined duration (cached or storage time). After expiration of the storage duration, the requested media content event is erased, over written, or otherwise deleted from the memory of the first edge server 110 so that the first edge server 110 may receive and transmit other data to other devices to which it is also linked.

Embodiments of the automatic content download manager system 100 are configured to predict which other ones of the non-requesting media devices 102a-i may be likely to, at a later time, request the same media content event. The prediction is based on an analysis of usage history, and/or a user history, of each of the other ones of the media devices 102a-i that are, or may be linked, to the first edge server 110. If identified as a media device 102 that is likely to be requesting the requested media content event at some future time, such media devices 102 are generically referred to herein as a "predicted requesting media device" 102. If embodiments of the automatic content download manager system 100 determine that one or more of the other media devices 102*a-i* is a predicted requesting media device 102, and therefore will be likely requesting the same media content event at a future time, identifiers of those other media devices 102*a-i* (identifiers of the predicted requesting media device 102) will be communicated to the first edge server 110.

Based on the received identifiers of the predicted requesting media devices 102 that are predicted to make a future request for the communicated media content event, the media content event is also sent from the first edge server 110 to those predicted requesting media devices 102 for storage. Then, if a user of those predicted requesting media devices 102 that have stored the media content event decides to request the media content event, the requested media content event is already available from the storage medium of their respective predicted requesting media device 102. Accordingly, the requested media content event does not have to be re-transmitted from the media content event access system 116 to the first edge server 110.

The identifiers of the predicted requesting media devices 102 may be communicated with the requested media content event to the first edge server 110. Alternatively, may be separately communicated to the first edge server 110. The identifiers of the requesting media device 102 and any identified predicted requesting media devices 102 may be communicated in any suitable manner. In an example embodiment, the identifiers are communicated via the links 118, 120 at the time of communication of the requested media content event to the first edge server 110. Alternatively, the identifiers may be included with, or embedded within, the communicated media content event. In other embodiments, the requesting media device 102 may communicate the identifiers to the first edge server 110 over an established Internet-based communication link (not shown).

An unexpected advantage provided by embodiments of the automatic content download manager system 100 is a cost savings to the media content provider that provides the requested media content event to subscribing media devices 102*a-i*. One skilled in the art appreciates that, in a fee based third party edger server system, each time that a media content provider sends a media content event to a requesting one of the media devices 102*a-i*, the media content provider must pay a transaction fee to the owner/operators of the communication system 108, the first edge server 110, and/or the second edge server 114 for the communication service. When multiple ones of the media devices 102*a-i* (the requesting media device 102 and the predicted requesting media devices 102) concurrently receive the same requested media content event from a single transaction, then the media content provider is able to provide the requested media content event to the plurality of media devices 102*a-i* using a single communication event that incurs a single transaction fee. Accordingly, the media content provider can avoid subsequent transaction fees when other ones of the media devices 102*a-i* (the predicted requesting media devices 102) later request the same media content event (since the requested media content event is already available on those predicted requesting media devices 102).

Another unexpected advantage provided by embodiments of the automatic content download manager system 100 is a bandwidth savings between the media content event access system 116 and the second edge server 114. In the event that different ones of the media devices 102*a-i* are concurrently requesting the media content event, and/or are requesting the media content event at different times, the requested media content event need only be sent the one time from the media content event access system 116 to the second edge server 114. Accordingly, bandwidth capacity of the communication link 118 between the media content event access system 116 and the second edge server 114 may be reduced. That is, the bandwidth capacity (defined as the maximum number of bits per second that may be communicated over the communication link 118, or bit peak rate) of the communication link 118 may be less than a corresponding communication link between the media content event access system 116 and the second edge server 114 if communication link capacity is otherwise required, on a real time basis, to communicate each and every requested media content event to each and every media device 102 that is serviced by the media content provider.

Further, bandwidth utilization of the communication link 118 between the media content event access system 116 and the second edge server 114 may be reduced. That is, bandwidth utilization (defined as the actual number of bits per second being currently communicated over the communication link 118) of the communication link 118 may be less than a corresponding communication link between the media content event access system 116 and the second edge server 114 if communication link utilization is otherwise used to communicate, on a real time basis, each and every requested media content event to each and every media device 102 that is serviced by the media content provider.

Further, another unexpected advantage provided by embodiments of the automatic content download manager system 100 is a bandwidth capacity and/or utilization savings over the communication link 120 established between the first edge server 110 and the second edge server 114. For example, if multiple ones of the media devices 102*a-i* are requesting the same media content event at non-coincident times (where the presentation times of the requested media content event are different at each of the requesting media devices 102*a-i*), then different portions of the requested media content event must be otherwise streamed across the communication link 120 at the same time. If the predicted requesting media devices 102 have previously received and saved the requested media content event during a single communication event, then the different portions of the requested media content event do not need to be concurrently communicated, and/or communicated multiple times, over the communication link 120. Accordingly, bandwidth utilization of the communication link 120 is reduced.

Further, there may be a memory capacity savings at the first edge server 110 and/or the second edge server 114. The requested media content event (or at least portions thereof) is temporarily stored at the first edge server 110 and/or second edge server 114 each time a requested media content event is communicated over the communication system 108. Since the requested media content event is communicated to multiple ones of the media devices 102*a-i* (the requesting media device 102 and one or more predicted requesting media devices 102) during a single communication event, then memory capacity and/or memory utilization at the first edge server 110 and/or the second edge server 114 will be reduced.

To facilitate disclosure of an exemplary embodiment of the automatic content download manager system 100, delivery of media content events to the media devices 102*a-i* are briefly described. The media content broadcast facility 106 receives media content, in the form of a plurality of media content events, from a plurality of local program providers or other content providers (not shown). The provided media content events may include, but are not limited to, a television program, a newscast, a broadcast sports event, a movie, or the like. The media content is typically provided in the form of a video stream and a synchronized audio stream. The media content broadcast facility 106 processes the received media content streams as necessary to prepare them for transmission to the plurality of media devices 102a-i. For example, commercials and/or other non-media content event type information may be incorporated with a particular media content event. Further, each media content may be associated with one or more identifiers, such as channel number and/or station call signs. The processed media content events are aggregated together and are broadcast over the media content broadcast system 104 in one or more media content streams 122. The media content streams 122 are received at each of the media devices 102a-i.

A variety of communication system types may be used by the media content broadcast system 104 to communicate the media content stream 122, in a broadcasted media content signal comprising a plurality of currently presentable media content events, to the media devices 102a-i. The media content broadcast system 104 may employ a satellite system 124 wherein an uplink signal 126 is communicated from a ground antenna 128 up to one or more satellites 130. The exemplary satellite 130 broadcasts a wireless satellite signal 132 down to a receiver antenna 134 that is coupled to a respective one of the media devices 102a-i. The media devices 102a-i receive the media content stream 122 from Their respective receiver antenna 134.

Alternatively, or additionally, the media content broadcast system 104 may employ an over the air (OTA) system 136, wherein the broadcasted media content signal is a wireless signal 138 that is communicated to the receiver antenna 134 or to another antenna (not shown). The media devices 102a-i receive the media content stream 122 from their respective receiver antenna 134 or the other antenna.

Alternatively, or additionally, the media content broadcast system 104 may employ a cable system 140, wherein the broadcasted media content signal is a wire-based signal with the media content stream 122 that is communicated using a suitable cable 142 or the like that is coupled to the media devices 102a-i. Non-limiting examples of the cable 142 include a fiber optic cable, a coaxial cable, and telephone line.

In an exemplary embodiment, the media content event access system 116 comprises a processor system 144, a memory 146, a media content storage system 148, an edge server interface 150, and a media content broadcast facility (MCBF) interface 152. The processor system 144 is communicatively coupled to the memory 146, and is controllably coupled to the media content storage system 148, the edge server interface 150, and the media content broadcast facility interface 152. The memory 146 includes memory medium regions that store the user history prediction logic 154, media content event (MCE) prediction logic 156, and/or a client information database 158. The user history prediction logic 154 and the media content event prediction logic 156 may be integrated together, and/or may be integrated with other logic, in the various embodiments. Other components not described herein may be included in other embodiments of the media content event access system 116. Further, the media content event access system 116 may be integrated within, or may reside within, the media content broadcast facility 106.

The media content storage system 148 employs a memory medium that is configured to store a plurality of different media content events, and/or media content events in different formats, such as, but not limited to, a standard definition format and a high definition format. Any number of media content events may be stored in the media content storage system 148. Selected media content events may be added to or deleted from the media content storage system 148 as desired. Preferably, management of the stored media content events is performed by the media content provider. Alternatively, other entities may manage the storage of media content events in the media content storage system 148.

In some embodiments, the media content storage system 148 is a distributed system that is managed by one or even multiple entities. Memory device components of a distributed media content storage system 148 may be communicatively coupled together and/or managed using any suitable communication system. In an example embodiment, different memory device components of the media content storage system 148 are communicatively coupled together via the example communication system 108.

The media content events may be received at the media content event access system 116 in a variety of manners. For example, media content events may be directly communicated from the media content broadcast facility 106 to the media content event access system 116 via an established communication link 160. Alternatively, or additionally, the media content event access system 116 may receive the media content events when broadcasted from the media content broadcast facility 106 (in a manner similar to that used by the media devices 102). Alternatively, or additionally, the media content events may be received on a portable memory medium, such as a compact disc (CD), a flash-type memory, a tape, or the like. Alternatively, or additionally, the media content events may be received from a remote device via the communication system 108 or another suitable communication system (not shown).

The memory 146 and/or the media content storage system 148 may be any suitable memory device or system. Depending upon the embodiment, the memory 146 and/or the media content storage system 148 may be a dedicated memory system, may be part of another component or system, and/or may be a distributed memory system. The memory 146 and/or the media content storage system 148 may also include other logic, modules and/or databases not illustrated or described herein. In some embodiments, the memory 146 and the media content storage system 148 may be implemented in the same memory medium, device, or system.

The edge server interface 150 is configured to communicatively couple the media content event access system 116 with the example second edge server 114 via the example communication link 118. In some embodiments, the edge server interface 150 is a generic server interface that may be configured to communicatively couple to a plurality of different second edge servers 114 that may be geographically dispersed at convenient locations. Further, the edge server interface 150 may support a plurality of communication links 118 established with multiple second edge servers 114. The communication link 118 may use any suitable medium and/or system, such as a fiber optic cable, a coaxial cable, a telephone line, a frame relay based system, an internet or intranet system, a local access network (LAN) system, an Ethernet system, a coaxial cable system, a radio frequency (RF) system, a cellular system, or the like. Furthermore, the communication link 118 may employ a hybrid system comprised of one or more of the above-described mediums and/or systems.

In practice, the media content broadcast facility interface 152 is a generic communication interface that is configured to communicatively couple the media content event access system 116 and the media content broadcast facility 106 via the communication link 160. The communication link 160 may use any suitable medium and/or system, such as a fiber optic cable, a coaxial cable, a telephone line, a frame relay based system, an internet or intranet system, a local access network (LAN) system, an Ethernet system, a coaxial cable system, a radio frequency (RF) system, a cellular system, or the like. Furthermore, the communication link 160 may employ a hybrid system comprised of one or more of the above-described mediums and/or systems.

When the user history prediction logic 154 is implemented as software, the user history prediction logic 154 can be stored on any computer-readable medium, such as the memory 146, for use by or in connection with any computer and/or processor related system, such as the example processor system 144. The memory 146 is a computer-readable medium that is an electronic, magnetic, optical, or other another physical device or means that contains or stores a computer and/or processor program. The user history prediction logic 154 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with the user history prediction logic 154. In the context of this disclosure, a "computer-readable medium" can be any means that can store, communicate, propagate, or transport the program associated with the user history prediction logic 154 for use by or in connection with the instruction execution system, apparatus, and/or device.

The computer-readable medium of memory 146 and/or the media content storage system 148 may be, for example, but not limited to, an electronic, magnetic, optical, electro-magnetic, infrared, or semiconductor system, apparatus, device, or propagation medium. More specific examples (a nonexhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). In some embodiments, the computer-readable medium, may be paper or another suitable medium upon which the program associated with the user history prediction logic 154 is printed, as the program can be electronically captured, via for instance optical scanning of the paper or other medium, then compiled, interpreted, or otherwise processed in a suitable manner, if necessary, and then stored in memory 146 or in another memory medium.

In some embodiments, the communication system 108 is a content distribution network that provides access to cached data, such as a requested media content event. Edge servers 110, 114, in a system administration context, are server devices that reside on an "edge" between two networks, typically a private network and the Internet, and is located close to a plurality of client devices (such as the media content event access system 116 and the media devices 102a-i). For example, the first edge server 110 is relatively close to the plurality of media devices 102a-i. The second edge server 114 is relatively close to the media content event access system 116. A plurality of edge servers, which may include the example edge servers 104, 114, are communicatively connected with each other and the private network over high capacity communication links. Some embodiments employ Transmission Control Protocol (TCP) and/or User Datagram Protocol (UDP) type connections that may be implemented on backbone network, such as, but not limited to, one or more fiber optic bundles.

In the various embodiments, the requested media content event is also sent to those predicted requesting media devices 102 for storage. The predicted requesting media devices 102 are identified by specifying their identifiers.

Embodiments of the automatic content download manager system 100 are configured to identify the predicted requesting media devices 102 from a large number of media devices 102a-i. Two criteria are used to identify a media device 102 as being one of the predicted requesting media devices 102.

A first criteria is a proximity criteria that corresponds to a proximity of a sub-group of the media devices 102a-i to the first edge server 110 that is providing the requested media content event to the requesting media device 102. That is, the sub-group of the media devices 102a-i must be able to establish a communication link 112 to the first edge server 110 that is providing the requested media content event to the requesting media device 102. For those media devices 102a-i that are unable to establish a communication link 112 to the first edge server 110 that is providing the requested media content event to the requesting media device 102, such media devices 102a-i would not be identified as a predicted requesting media device 102.

Information identifying sub-groups of media devices 102 that are able to establish a communication link 112 to a particular one of a plurality of first edge servers 104 is stored in the memory 146, such as in the client information database 158. The identifiers of the media devices 102a-i is a particular sub-group of media devices 102 are associated with the sub-group and are stored in the client information database 158. Alternatively, or additionally, one or more of those first edge servers 110 to which a particular media device 102 is capable of establishing a link with may be stored with, or associated with, identifiers of each one of the media devices 102. Any suitable database format may be used to identify members of a particular sub-group of media devices 102 by the various embodiments.

A media device 102 may be a member of multiple sub-groups of media devices 102. In such situations, the automatic content download manager system 100 also tracks if and/or when a requested media content event is sent to that particular media device 102 when it has been identified as a predicted requesting media device 102 or a requesting media device 102. Accordingly, the requested media content event is not sent to that particular media device 102 multiple times.

A second criteria is a user media content event preference criteria that corresponds to one or more characteristics of available media content events that the user may be interested in receiving at their media device 102. Based on a history of user selection of media content events, and/or based on a history of media content events requested by an associated media device 102, a plurality of media content event characteristics are identified which correlate to media content events that are likely to be requested by the user of a particular one of the media devices 102a-i and/or the associated media device 102. That is, embodiments of the automatic content download manager system 100 are configured to learn about the user's media content event selection habits and/or about a media device's 102 request pattern. Based upon what is learned about a particular user and/or media device 102, embodiments are configured to predict whether or not a requested media content event that is communicated to a requesting media device 102 is also likely to also be requested by the media device 102 of that particular user.

In an example embodiment, a history of selected media content events selected by users of each of the media devices 102*a-i* serviced by the media content provider may be stored in the client information database 158 or may be stored in another suitable memory medium. Alternatively, or additionally, a history of selected media content events requested by each of the media devices 102*a-i* serviced by the media content provider are stored in the client information database 158 or may be stored in another suitable memory medium.

Each media content event is associated with a plurality of media content event characteristics. A non-limiting example of a media content event characteristic includes one or more subject matter themes of the media content event. For example, the media content event may be associated with an action theme, a romance theme, a comedy theme, a travel theme, or the like. Other non-limiting media content event characteristics are identities of actors, identities of directors, identities of producers, identification of film locations, identity of a film production entity, identity of a media content event title (such as for a television series or the like), or the like.

The processor system 144, executing the user history prediction logic 154, analyzes the media content event characteristics of a plurality of media content events that have been selected by the user of a particular media device 102. The media content event characteristics of selected media content events are used to identify one or more user preferences. The user preferences are defined by identifying those media content event characteristics that are common among the selected media content events.

For example, but not limited to, the media device 102*a* may often present action themed media content events and comedy themed media content events to the users of the media device 102*a*. Alternatively, or additionally, a particular media device 102*a* may often present media content events with the actor Bob Smith, and/or media content events filmed in a jungle. In contrast, the media device 102*b* may often present romantic themed media content events and comedy themed media content events to the users of the media device 102*b*. Alternatively, or additionally, a particular media device 102*b* may often present media content events with the actor John Doe, and/or media content events filmed in Paris.

In the above illustrative simplified examples, the automatic content download manager system 100 would "learn" that the media device 102*a* is likely to request media content events that have action themes, have comedy themes, have the actor Bob Smith, and/or that are filmed in the jungle. In contrast, the automatic content download manager system 100 would "learn" that the media device 102*b* is likely to request media content events that have romantic themes, have comedy themes, have the actor John Doe, and/or that are filmed in Paris. The preferred media content event characteristics are determined and stored in the client information database 158. Over time, for each of the many media devices 102*a-i*, a large number of preferred media content event characteristics may be associated with each particular media device 102. The associated preferred media content event characteristics may be based on history of a single user, an identified user, or a group of users, that are associated with a particular media content event.

When the media content event access system 116 sends a particular requested media content event to the first edge server 110 for communication to the requesting media device 102, the processors system 144, executing the media content event prediction logic 156, accesses information in the client information database 158 to identify any predicted requesting media devices 102 that should also concurrently receive the requested media content event from the first edge server 110.

Initially, the sub-groups of media devices 102 that are configured to establish a communication link with the first edge server 110 receiving the requested media content event are identified. In other embodiments, those media devices 102 that are able to establish a communication link 112 to the first edge server 110 are identified.

Then, for the identified media devices 102, media content event characteristics associated with the requested media content event are compared with the learned preferred media content event characteristics of the identified media devices 102 of the sub-group. When a correlation between the media content event characteristics of the requested media content event is made with the learned preferred media content event characteristics of a particular media device 102, that media device 102 is identified as a predicted requesting media device 102. The identifier of that identified media device (now identified as a predicted requesting media device 102) is communicated to the first edge server 110.

In response to receiving the identifiers of one or more predicted requesting media devices 102, the first edge server 110 communicates the received requested media content event to those predicted requesting media devices 102. If a communication link 112 exists between the receiving first edge server 110 and the identified predicted requesting media device 102, the requested media content event is sent from the first edge server 110 to the predicted requesting media device 102 over the established communication link 112.

In the event that the communication link 112 is not currently established between the receiving first edge server 110 and the identified predicted requesting media device 102, the receiving first edge server 110 initiates establishment of the communication link 112. In such situations, the predicted requesting media device 102 associated with the second identifier is configured to establish a communication link over the first edge server 110 in response to receiving a request from the first edge server 110. Any suitable process and/or protocol may be used to establish the communication link 112 between the first edge server 110 and an identified predicted requesting media device 102.

Continuing with the above simplified illustrative example, a first requested media content event may be associated with an action media content event theme. Further, the user history prediction logic 154 has learned that the media device 102*a* is likely to request action themed media content events. The processor system 144, executing the media content event prediction logic 156 and in response to the first requested media content event being sent to the first edge server 110, would identify the media devices 102*a* and 102*b* as being a member of the sub-group of media devices 102 that may establish a communication link 112 with the receiving first edge server 110. Since the media device 102*a* is likely to request action themed media content events, and since the first requested media content event has an action theme, the media device 102*a* would be identified as a predicted requesting media device 102. In contrast, since the media device 102b is not likely to request action themed media content events (since action themes are not associated with the learned preferred media content event characteristics of the media device 102b), the media device 102b would not be identified as a predicted requesting media device 102. Accordingly, the media content event access system 116 would provide the identity of the media device 102a to the first edge server 110 so that the first requested media content event may also be communicated to the media device 102a.

Continuing with the simplified illustrative example, a second requested media content event may be associated with romantic media content event theme. Further, the user history prediction logic 154 has learned that the media device 102b is likely to request romantic themed media content events. The processor system 144, executing the media content event prediction logic 156 and in response to the second requested media content event being sent to the first edge server 110, would identify the media devices 102a and 102b as being a member of the sub-group of media devices 102 that may establish a communication link 112 with the receiving first edge server 110. Since the media device 102b is likely to request romantic themed media content events, and since the requested media content event has a romantic-based theme, the media device 102b would be identified as a predicted requesting media device 102. In contrast, since the media device 102a is not likely to request action themed media content events (since romantic themes are not associated with the learned preferred media content event characteristics of the media device 102a), the media device 102a would not be identified as a predicted requesting media device 102. Accordingly, the media content event access system 116 would provide the identity of the media device 102b to the first edge server 110 so that the second requested media content event may also be communicated to the media device 102b.

Continuing with the simplified illustrative example, a third requested media content event may have both of the actors Bob Smith and John Doe. Further, the user history prediction logic 154 has learned that the media devices 102a and 102b are likely to request media content events with these two actors. The processor system 144, executing the media content event prediction logic 156 and in response to the second requested media content event being sent to the first edge server 110, would identify the media devices 102a and 102b as being a member of the sub-group of media devices 102 that may establish a communication link 112 with the receiving first edge server 110. Since the media device 102a is likely to request media content events with the actor Bob Smith, and since the media device 102b is likely to request media content events with the actor John Doe, the media devices 102a and 102b would be identified as a predicted requesting media devices 102. Accordingly, the media content event access system 116 would provide the identity of the media devices 102a and 102b to the first edge server 110 so that the second requested media content event may also be communicated to the media devices 102a and 102b.

In some embodiments, other supplemental media content event characteristics may be associated with a particular media device. Such supplemental media content event characteristics may be stored in the client information database 158 or in another suitable memory. The supplemental media content event characteristics may be used in determining whether a requested media content event should also be sent to a particular media device when it is identified as a predicted requesting media device 102. For example, the media device 102a may historically tend to have a preference for high definition format media content events. In contrast, media device 102b may tend to have a preference for standard definition media content events. If a high definition format requested media content event is sent to the first edge server 110, and if the media device 102a is identified as a predicted requesting media device 102, then the high definition format requested media content event may also be sent to the media device 102a. In contrast, since the media device 102b is not associated with high definition format media content events, the media device 102b would not be identified as a predicted requesting media device 102.

In the various embodiments, the user history prediction logic 154 may employ any suitable algorithm, or multiple algorithms, for learning about user preferences that are associated with the media devices 102a-i. Selection of media content event characteristics for use in predicting user preferences may be based on any characteristic that may be associated with media content events. Further, any suitable number of media content event characteristics may be used to predict user preferences.

Information pertaining to user selection of media content events may be obtained from one or more sources. Alternatively, or additionally, information pertaining to media content events requested by particular media devices 102 may be obtained from the sources. In an example embodiment, information corresponding to user selection (or selection by an associated media device 102) of premium media content events that are provided on a pay-for-view basis is provided by the media content provider. For example, the purchase of pay-per-view media content events, such as movies, sporting events, or the like, may be tracked by the media content provider, and then the associated information may be communicated to the media content event access system 116. Alternatively, or additionally, the media content provider may provide information pertaining to the media content event characteristics of purchased media content events.

Alternatively, or additionally, information pertaining to user selection of media content events may be obtained from each one of the media devices 102a-i. For example, information may be obtained from user selection of media content events made while using a graphical user interface, such as a program guide or the like. Alternatively, or additionally, information identifying media content events stored on the DVR of the media device 102 may be provided to the media content event access system 116 by the media devices 102. The media device 102 may provide the title or other identifier of a user selected media content event to the media content event access system 116. The media content event access system 116 may then look up or obtains media content event characteristics associated with the identified media content event. Alternatively, or additionally, the media device 102 may provide supplemental information pertaining to a selected media content event, such as meta data, to the media content event access system 116. The supplemental information may be used as the media content event characteristics and/or may be correlated with other media content event characteristics that are used to determine user preferences.

Alternatively, or additionally, information that may be used to determine user preferences may be obtained from a third party. For example, a history of user purchases and rentals from a media content event provider of digital video discs (DVDs) may be obtained. The user's DVD purchase and/or DVD rental history may then be processed to determine the plurality of preferred media content event characteristics associated with the user. When a user identifier (such as a name, account number, drivers license, or the like)

has been associated with the identifier of a particular media device 102, then such information may be used to determine user preferences.

Alternatively, or additionally, information that may be used to determine user preferences may be provided by the users themselves. For example, the user may provide information by answering questions on a questionnaire and/or may select preferences of interest from a list of preferences. The questionnaire and/or list of preferences of interest may be presented to the user on a graphical user interface presented on the media presentation device 107 and/or may be in hard copy form that is mailed to the media content provided or another entity for processing. A user identifier (such as a name, account number, drivers license, or the like) of the user providing the information may be associated with a particular media device 102.

Figure 2:
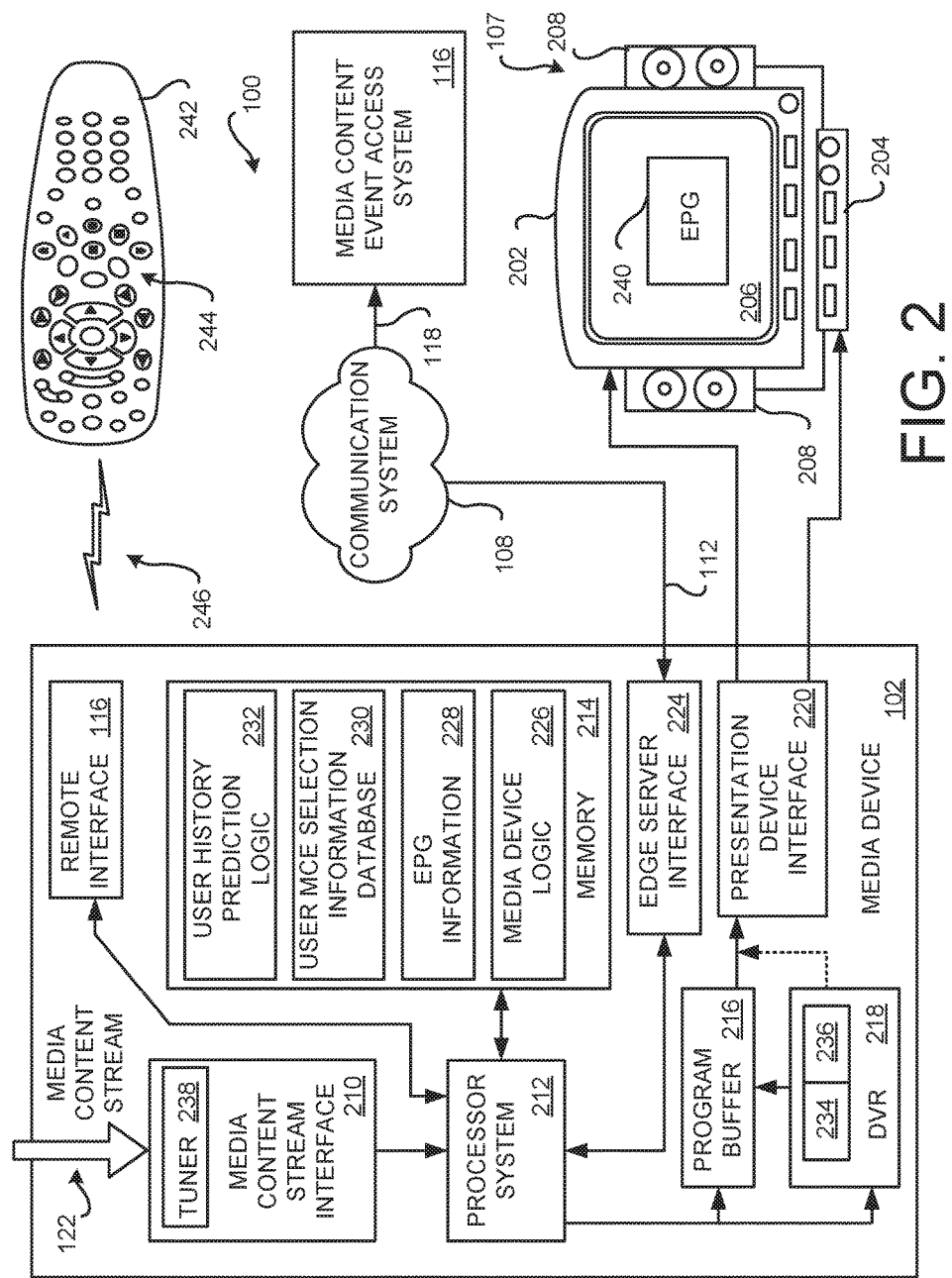
FIG. 2 is a block diagram of an exemplary media device.

FIG. 2 is a block diagram of an exemplary media device 102. The exemplary media device 102 is communicatively coupled to a media presentation system 107 that includes a visual display device 202, such as a television (hereafter, generically a TV), and an audio presentation device 204, such as a surround sound receiver (hereafter, generically, a speaker). Other types of output devices may also be coupled to the media device 102, including those providing any sort of stimuli sensible by a human being, such as temperature, vibration and the like. The video portion of the media content event is displayed on the display 206 and the audio portion of the media content event is reproduced as sounds by one or more speakers 208. In some embodiments, the media device 102 and one or more of the components of the media presentation system 106 may be integrated into a single electronic device.

The non-limiting exemplary media device 102 comprises a media content stream interface 210, a processor system 212, a memory 214, a program buffer 216, an optional storage medium (such as, but not limited to, a digital video recorder (DVR)) 218, a presentation device interface 220, a remote interface 222, and an edge server interface 224. The processor system 212 is communicatively coupled to at least the media content stream interface 210 and the edge server interface 224, and is controllably coupled at least to the DVR 218. The memory 214 comprises portions for storing the media device logic 226, the electronic program guide (EPG) information 228 optional user media content event (MCE) selection information database 230, and the optional user history prediction logic 232. In some embodiments, the video device logic 226 and the user history prediction logic 232 may be integrated together, and/or may be integrated with other logic. Other media devices 102 may include some, or may omit some, of the above-described media processing components. Further, additional components not described herein may be included in alternative embodiments.

The DVR 218 comprises at least two portions 234 and 236. The user accessible portion 234 is user accessible and may be used to store user specified media content events. In an example embodiment, the other portion is hidden from the user. That is, the user is not able to independently access the hidden portion 236 and/or access a listing of the stored contents of the hidden portion 236. Media content events received from the first edge server 104 are stored in the user inaccessible hidden portion 236 if the user is not to have independent access to the received media content events. Prior to accessing a stored media content event stored in the hidden portion 236, the user must first obtain access authorization from the media service provider. Access authorization may be provided in any suitable manner. Once the access authorization has been granted, the requested media content event may be immediately retrieved from the hidden portion 236 for presentation to the user However, some media content events received from the first edge server 110 may be stored in the user accessible portion 234, and thus be accessible by the user. Received media content events stored on the user accessible portion 234 may be freely available type media content events, such as a previously broadcasted television show, movie, news cast, sporting event or the like. Accordingly, the media device 102 may access the requested media content event from the user accessible portion 134 immediately in response to a user request for presentation of the stored media content event. Thus, a virtual video on demand for providing access to free programming may be emulated by the media devices 102.

The functionality of the media device 102, here a set top box, is now broadly described. A media content provider provides media content that is received in one or more multiple media content streams 122 multiplexed together in one or more transport channels. The transport channels with the media content streams 122 are communicated to the media device 102 from a media system sourced from the remote media content broadcast facility 106 (FIG. 1) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 104 can be received from one or more different sources, such as, but not limited to, a cable system, a radio frequency (RF) communication system, or the Internet.

The one or more media content streams 122 are received by the media content stream interface 210. One or more tuners 238 in the media content stream interface 210 selectively tune to one of the media content streams 122 in accordance with instructions received from the processor system 212. The processor system 212, executing the media device logic 226 and based upon a request for a media content event of interest specified by a user, parses out media content associated with the media content event of interest. The media content event of interest is then assembled into a stream of video and/or audio information which may be stored by the program buffer 216 such that the media content can be streamed out to components of the media presentation system 107, such as the visual display device 202 and/or the audio presentation device 204, via the presentation device interface 220.

Alternatively, or additionally, the parsed out media content may be saved into the portion 234 of the DVR 218 for later presentation. The storage device, such as the example DVR 218 or another storage medium, may be directly provided in, locally connected to, or remotely connected to, the media device 102. In alternative embodiments, the media content streams 122 may be stored for later decompression, processing and/or decryption.

From time to time, information populating the EPG information 228 portion of the memory 214 is communicated to the media device 102, via the media content stream 104 or via another suitable media. The EPG information 228 portion stores the information pertaining to the scheduled programming. The information may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information. Upon receipt of a command from the user requesting presentation of an EPG 240 on the display 206, the information in the EPG information 228 is retrieved, formatted, and then presented on the display 206 as an EPG 240.

In the various embodiments, the EPG 240 may be modified to present a listing of available media content events that may be selected by the user. A listing of the available media content events may be stored as information in the EPG information or may be separately stored in the memory 214. Alternatively, or additionally, the media device 102 may be operated to establish a communication link (not shown) to the media content event access system 116 or another remote device where information pertaining to the available media content events may be retrieved.

The exemplary media device 102 is configured to receive commands from a user via a remote control 242. The remote control 242 includes one or more controllers 244. The user, by actuating one or more of the controllers 244, causes the remote control 242 to generate and transmit commands, via a wireless signal 246, to the media device 102. The commands control the media device 102 and/or control the media presentation devices 128. The wireless signal 246 may be an infrared (IR) signal or a radio frequency (RF) signal that is detectable by the remote interface 116.

The processes performed by the media device 102 relating to the processing of the received media content stream 122 and communication of a presentable media content event to the components of the media presentation system 107 are generally implemented by the processor system 212 while executing the media device logic 226. Thus, the media device 102 may perform a variety of functions related to the processing and presentation of one or more media content events received in the media content stream 122 and/or stored in the DVR 218.

Some embodiments of the media device 102 are configured to communicate with devices operated by the media content provider. For example, if a media content event is of interest to a user of the media device 102, and the media content event is a pay-for-view type of event, the user may electronically purchase the pay-for-view media content event by operating the media device 102. Accordingly, the media service provider is aware of those pay-for-view media content events purchased at the media device 102.

When user media content event selection history is provided to the media content event access system 116 by the media service provider, the information may be based on the pay-for-view media content events purchased at the media device 102. Accordingly, the media content event access system 116 may use the provided information to generate the user information that is saved into the client information database 158.

Alternatively, or additionally, information pertaining to all types of selected media content events may be stored by the media device 102. For example, when a user selects a media content event by navigating about the presented EPG 240, information pertaining to the user selections may be stored in the user media content event selection information database 230 portion of the memory 214. For example, titles of other identifiers of selected media content events may be saved into the user media content event selection information database 230. Alternatively, or additionally, if information corresponding to the media content event characteristics of selected media content events is available, that information may optionally be saved into the user media content event selection information database 230.

In such embodiments that save user selection information into the user media content event selection information database 230, the information may be periodically downloaded to the media content event access system 116 or to another device. For example, the edge server interface 214, or another interface, may be configured to periodically establish a communication link to a remote device under the control of the media content service provider of another entity to receive software updates or other information. The information pertaining to the user selections of media content events may then be downloaded from the media content event selection information database 230 portion of the memory 214 to the connected device.

Alternatively, or additionally, the media device 102 may initiate establishment of the links 112, 120, 118 so as to directly connect to the media content event access system 116. Once communications are established between the media device 102 and the media content event access system 116, the information pertaining to the user selections of media content events may then be downloaded from the media device 102 to the media content event access system 116. Further, the information pertaining to the user selections of media content events may be downloaded from the media device 102 to the media content event access system 116 any time a media content event is received from the first edge server 110.

Some embodiments of the media device 102 may be configured to determine user preferences. The processor system 212, executing the user history prediction logic 232, may access information stored in the user media content event selection information database 230. The accessed information is analyzed to determine media content event characteristics that are of interest to the user. The determined user preference information may be saved into the user media content event selection information database 230 or into another portion of the memory 214 or into another memory. Once communications are established between the media device 102 and the media content event access system 116, the determined user preference information may then be downloaded from the media device 102 to the media content event access system 116. Further, the determined user preference information may be downloaded from the media device 102 to the media content event access system 116 any time a media content event is received from the first edge server 110

In some embodiments, the media device 102 may receive a user request for a particular requested media content event, such as when the user is navigating about a presented EPG 240 which lists available media content events. Prior to accessing the requested media content event from a remote device, the media device 102 may optionally check the first edge server 110 to determine if the requested media content event is already residing on the memory of the first edge server 110. If the requested media content event, or a portion of the requested media content event, is already at the first edge server 110, then the requested media content event (or portion thereof) may be retrieved from the first edge server 110. In the event that a portion of the requested media content event is available at the first edge server 110, the amount of data to obtain the entire requested media content event will be reduced, thereby conserving communication system resources.

In some embodiments, an initial portion of a requested media content event is sent to predicted requesting media devices 102. Accordingly, when the user of the media device 102 requests the media content event, the initial stored portion of the media content event may be presented to the user while the remaining portion of the media content event is accessed from another remote media content delivery device or from the media content event access system 116. When presentation of the stored initial portion of the media content event has concluded, then presentation of the retrieved remaining portion begins. An unexpected benefit of this embodiment is that memory capacity of the media device 102 which is used for storing only the initial portion of the requested media content event may be reduced (as compared to storing the entirety of the media content event at the media device 102). Accordingly, initial portion for a greater number of different available media content events can be received from the first edge server 110 and stored in the hidden portion 236 and/or the user accessible portion 234 of the DVR 218 (since storage of a very large number of media content events in their entirety at the media device 102 may not be practical or even possible).

Various embodiments of the automatic content download manager system 100 may be configured to cooperatively operate with other methods and apparatuses which operate the media devices 102. For example, the automatic content download manager system 100 may cooperatively operate with a video on demand system. As another example, the automatic content download manager system 100 may operate in cooperation with a maintenance system which updates and/or downloads software to the media devices 102.

It should be emphasized that the above-described embodiments of the automatic content download manager system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for providing media content events from a first edge server to a plurality of media devices, the method comprising:
   receiving, at the first edge server, a media content event from a media content access event system that has previously stored the media content event,
      wherein the media content event was requested by a first media device that is a first member of the plurality of media devices communicatively coupled to the first edge server via a first communication link,
      wherein each of the plurality of media devices are configured to communicatively couple to the first edge server via other communication links,
      wherein the first edge server is communicatively coupled to a second edge server via a communication system,
      wherein the second edge server is communicatively coupled to the media content event access system via a second communication link, and
      wherein the media content event requested by the first media device is communicated from the media content access event system to the first edge server via the second edge server;
   storing the media content event requested by the first media device at the first edge server,
      wherein the media content event requested by the first media device is stored at the first edge server for a predefined storage duration, and
      wherein the media content event requested by the first media device is no longer stored at the first edge server after the predefined storage duration;
   receiving, at the first edge server, a first identifier of the first media device,
      wherein the first identifier of the first media device is associated with the media content event requested by the first media device to identify the first media device as being the one of the plurality of media devices that requested the media content event;
   communicating the media content event from the first edge server to the first media device based on the first identifier;
   receiving, at the first edge server, a second identifier that uniquely identifies a second media device that is a second member of the plurality of media devices,
      wherein the second media device is a member of the plurality of media devices communicatively coupled to the first edge server,
      wherein the second identifier is received after the media content event requested by the first media device has been stored at the first edge server,
      wherein the media content event requested by the first media device has not been requested by the second media device; and
      wherein the second identifier is received before expiration of the predefined storage duration;
   retrieving the media content event requested by the first media device stored at the first edge server;
   communicating the retrieved media content event requested by the first media device from the first edge server to the second media device based on the second identifier,
      wherein the media content event requested by the first media device is stored in a first portion of a storage medium of the second media device that is operable to store a plurality of media content events when the second media device is authorized to permit a user to access the media content event that has been communicated from the first edge server to the second media device,
      wherein the media content event requested by the first media device is stored in a second portion of the storage medium of the second media device when the second media device is not authorized to permit the user to access the media content event that has been communicated from the first edge server to the second media device,
      wherein the second media device presents an electronic program guide (EPG) that includes a list that identifies a first plurality of media content events received from the first edge server that are stored in the first portion of the storage medium of the second media device, and
      wherein a second plurality of media content events that have been received from the first edge server that are stored in the second portion of the storage medium of the second media device are omitted from the EPG list of the media content events presented by the second media device;
   communicating a request from the second media device to access the media content event, wherein the request is communicated only when the media content event been stored in the second portion of the storage medium of the second media device, and wherein the request is received at the media content event access system; and receiving authorization at the second media device from the media content event access system that authorizes the second media device to access the media content event stored in the second portion of the storage medium of the second media device, wherein the authorization permits the user of the second media device to access the media content event that is stored in the second portion of the storage medium.

2. The method of claim 1, wherein receiving the second identifier comprises:

receiving the second identifier from the media content event access system.

3. The method of claim 2, where in response to receiving the second identifier from the media content event access system, and wherein prior to communicating the retrieved media content event requested by the first media device from the first edge server to the second media device, the method further comprising:

establishing a third communication link between the first edge server and the second media device, wherein the retrieved media content event requested by the first media device is then communicated from the first edge server to the second media device via the third communication link.

4. The method of claim 1, wherein after receiving the second identifier and after communicating the retrieved media content event requested by the first media device from the first edge server to the second media device based on the second identifier, the method further comprises:

receiving the request at the media content event access system from the second media device that includes the second identifier, wherein the request from the second media device is for access to the media content event requested by the first media device;

determining, at the media content event access system, whether the second media device is authorized to access the media content event requested by the first media device in response to receiving the request from the second media device; and communicating access authorization to the second media device, wherein based on the communicated access authorization, the second media device accesses the media content event requested by the first media device that is stored in the storage medium of the second media device.

5. The method of claim 1, wherein after the predefined storage duration, the method further comprising:

erasing the media content event requested by the first media device that is stored at the first edge server in response to expiration of the predefined storage duration.

6. The method of claim 1, wherein the communication system communicatively coupling the first edge and the second edge server is a private data transport system that transports the media content event requested by the first media device from the second edge server to the first edge server for a fee.

7. The method of claim 1, wherein the second identifier is one of a plurality of second identifiers, wherein communicating the retrieved media content event requested by the first media device to the second media device further comprises:

communicating the retrieved media content event requested by the first media device from the first edge server to members of a plurality of second media devices that are identified by the plurality of second identifiers.

8. The method of claim 1, wherein prior to communicating the retrieved media content event requested by the first media device from the first edge server to the second media device based on the second identifier, the method further comprising:

predicting, at the media content event access system, that a user of the second media device will want to access the media content event requested by the first media device, wherein the second identifier received at the first edge server that uniquely identifies the second media device is communicated from the media content event access system to the first edge server.

9. The method of claim 1, wherein prior to communicating the retrieved media content event requested by the first media device from the first edge server to the second media device based on the second identifier, the method further comprising:

predicting, at the second media device, that a user of the second media device will want to access the media content event requested by the first media device, wherein the second identifier received at the first edge server that uniquely identifies the second media device is communicated from the second media device to the first edge server.

10. The method of claim 1, wherein the first edge server does not communicate the media content event requested by the first media device to other ones of the plurality of media devices communicatively coupled to the first edge server unless the unique identifiers of selected ones of the plurality of media devices are received at the first edge server, and wherein the media content event requested by the first media device is communicated only to those other ones of the plurality of media devices in response to their unique identifier being received at the first edge server.

11. The method of claim 1, wherein after receiving the authorization at the second media device from the media content event access system that authorizes the second media device to access the media content event stored in the second portion of the storage medium of the second media device, the method further comprises:

presenting by the second media device an updated EPG that includes an updated list that identifies the first plurality of media content events received from the first edge server that are stored in the first portion of the storage medium of the second media device, wherein the updated list further identifies the media content event for which the authorization was received.

12. The method of claim 1, wherein after receiving the authorization at the second media device from the media content event access system that authorizes the second media device to access the media content event stored in the second portion of the storage medium of the second media device, the method further comprises:

receiving a user request to present the media content event for which the authorization was received; and accessing the media content event, wherein the second media device presents the media content event to the user.

13. A first media device, wherein the first media device is identified by an identifier that uniquely identifies the first media device from a plurality of media devices, the first media device comprising:

an edge server interface operable to communicatively couple to a first edge server, wherein the first edge server is communicatively coupled to a second edge server via a communication link of a private data transport system,
wherein the first edge server is communicatively coupled to the plurality of media devices, and
wherein a media content event access system is communicatively coupled to the second edge server via a communication system that is different from the private data transport system;
a storage medium operable to store a plurality of media content events,
wherein the storage medium is defined by a first portion configured to store a first type of media content events that are accessible by a user, and
wherein the storage medium is further defined by a second portion configured to store a second type of media content events that are hidden from the user; and
a processor system communicatively coupled to the storage medium and the edge server interface, wherein the processor system is configured to:
receive a media content event requested by a second media device of the plurality of media devices that are communicatively coupled to the first edge server,
wherein the second media device is receiving the requested media content event from the first edge server,
wherein the media content event requested by the second media device has not yet been requested by the first media device; and
wherein the media content event requested by the second media device is communicated to the first media device from the first edge server in response to the first edge server receiving the identifier of the first media device;
store the received media content event requested by the second media device in the first portion of the storage medium if the first media device is currently authorized to access the received media content event requested by the second media device; and
store the received media content event requested by the second media device in the second portion of the storage medium that is hidden from the user if the first media device is not currently authorized to access the received media content event requested by the second media device; and
present an electronic program guide (EPG) by the first media device that includes a list of the media content events received from the first edge server that are stored in the first portion of the storage medium of the first media device,
wherein other media content events that have been received from the first edge server that are stored in the second portion of the storage medium of the first media device are omitted from the EPG list presented by the first media device.

14. The first media device of claim 13, wherein the processor system is further configured to:
generate information presentable to the user that identifies media content events stored in the first portion of the storage medium, wherein information identifying other media content events stored in the second portion of the storage medium is not presentable to the user,
wherein in response to a request from the user to access the media content event requested by the second media device that is stored in the second portion of the storage medium, authorization from the media content event access system is received from the first edge server to access the media content event requested by the second media device from the second portion of the storage medium,
wherein the media content event requested by the second media device is accessed from the second portion of the storage medium, and
wherein the media content event requested by the second media device is presented to the user.

15. The first media device of claim 13, wherein the processor system is further configured to:
generate information presentable to the user that identifies media content events stored in the first portion of the storage medium and identifies other media content events stored in the second portion of the storage medium is not presentable to the user,
wherein in response to a request from the user to access the media content event requested by the second media device that is stored in the second portion of the storage medium, authorization from the media content event access system is received from the first edge server to access the media content event requested by the second media device from the second portion of the storage medium, and
wherein the media content event requested by the second media device is accessed from the second portion of the storage medium wherein the media content event requested by the second media device is presented to the user.

16. The first media device of claim 13, wherein the media content event access system predicts that the user of the first media device will want to access the media content event requested by the second media device, and wherein the media content event access system communicates the identifier of the first media device to the first edge server such that the first edge server communicated the media content event requested by the second media device to the first media device in response to receiving the identifier of the first media device.

17. The first media device of claim 13, wherein the processor system is further configured to:
establish a communication link via the edge server interface to the first edge server in response to a request from the user to access the media content event requested by the second media device that is stored in the second portion of the memory; and
communicate a request to the media content event access system, via the first edge server, wherein the request is for access to the media content event requested by the second media device that is stored in the second portion of the storage medium;
receive authorization, via the first edge server, to access the media content event requested by the second media device that is stored in the second portion of the storage medium; and
access the media content event requested by the second media device that is stored in the second portion of the storage medium in response to receiving the authorization,
wherein the media content event requested by the second media device that is stored in the second portion of the storage medium is then presented by the first media device.

18. The first media device of claim 13, further comprising:
a memory communicatively coupled to the processor system, the memory comprising:

a first portion that stores user media content event selection information that identifies previously presented media content events and that stores at least one media content event characteristic associated with each of the previously presented media content events; and a second portion that stores user history prediction logic, wherein the processor system, executing the user history prediction logic, is further configured to:

retrieve the media content event characteristics associated with the previously presented media content events;

compare the retrieved media content event characteristics with each other;

identify at least one preferred media content event characteristic; and communicate the identified at least one preferred media content event characteristic to the media content event access system, wherein the media content event access system determines that the first media device is to receive the media content event requested by the second media device from the first edge server when at least one media content event characteristic of the media content event requested by the second media device corresponds to the at least one preferred media content event characteristic communicated from the first media device.

19. A method of providing media content events from a first edge server to a plurality of media devices that are communicatively coupled to the first edge server, wherein each one of the plurality of media devices are identified by a unique identifier, comprising:

receiving, at a first media device communicatively coupled to the first edge server, a media content event requested by a second media device that is also receiving the media content event from the first edge server, wherein the received media content event requested by the second media device has not yet been requested by the first media device, wherein the first media device and the second media device are members of the plurality of media devices that are communicatively coupled to the first edge server, wherein the first edge server is communicatively coupled to a second edge server via a communication link of a private data transport system, wherein a media content event access system is communicatively coupled to the second edge server via a communication system that is different from the private data transport system, wherein the media content event requested by the second media device is communicated from the media content event access system to the first edge server, and wherein the media content event requested by the second media device is communicated to the first media device from the first edge server in response to the first edge server receiving the identifier of the first media device;

storing the received media content event requested by the second media device in a first portion of a storage medium of the first media device if the first media device is currently authorized to access the received media content event requested by the second media device;

storing the received media content event requested by the second media device in a second portion of the storage medium of the first media device, wherein the second portion of the storage medium is hidden from a user if the first media device is not currently authorized to access the received media content event requested by the second media device; and presenting an electronic program guide (EPG) by the first media device that includes a list of the media content events received from the first edge server that are stored in the first portion of the storage medium of the first media device, wherein other media content events that have been received from the first edge server that are stored in the second portion of the storage medium of the first media device are omitted from the EPG list presented by the first media device.

20. The method of claim 19, wherein the media content event requested by the second media device is a first media content event, wherein the first edge server has stored a second media content event that is stored for a predefined duration, wherein the second media content event is no longer stored at the first edge server after the predefined storage duration, and further comprising:

communicating a request for the second media content event to the media content event access system in response to a user request to access the second media content event, wherein the request is communicated prior to the expiration of the predefined storage duration; and receiving the second media content event stored at the first edge server in response to the media content event access system receiving the request and in response to the media content event access system providing the identifier of the first media device to the first edge server.

* * * * *